(12) United States Patent
Raikar et al.

(10) Patent No.: US 10,965,983 B2
(45) Date of Patent: Mar. 30, 2021

(54) LIVE THUMBNAIL IMAGE GENERATION

(71) Applicant: Sling Media Pvt. Ltd., Bangalore (IN)

(72) Inventors: Yatish Jayant Naik Raikar, Karnataka (IN); Varunkumar Tripathi, Karnataka (IN); Soham Sahabhaumik, Karnataka (IN); Rakesh Ramesh, Karnataka (IN)

(73) Assignee: Sling Media Pvt. Ltd., Bangalore (IN)

( * ) Notice: Subject to any disclaimer, the term of this patent is extended or adjusted under 35 U.S.C. 154(b) by 83 days.

(21) Appl. No.: 16/047,226

(22) Filed: Jul. 27, 2018

(65) Prior Publication Data
US 2020/0037020 A1   Jan. 30, 2020

(51) Int. Cl.
| | | |
|---|---|---|
| *H04N 21/431* | (2011.01) | |
| *H04N 21/4405* | (2011.01) | |
| *H04N 21/845* | (2011.01) | |
| *H04N 21/422* | (2011.01) | |

(52) U.S. Cl.
CPC ... *H04N 21/4312* (2013.01); *H04N 21/42204* (2013.01); *H04N 21/4405* (2013.01); *H04N 21/8455* (2013.01)

(58) Field of Classification Search
CPC ........... H04N 21/4312; H04N 21/4405; H04N 21/8455; H04N 5/4403
See application file for complete search history.

(56) References Cited

U.S. PATENT DOCUMENTS

| | | | |
|---|---|---|---|
| 8,364,009 B2 | 1/2013 | Mountain | |
| 8,621,514 B2 | 12/2013 | Yao et al. | |
| 2010/0031297 A1* | 2/2010 | Klein | H04L 12/12 725/78 |
| 2011/0013882 A1* | 1/2011 | Kusunoki | G11B 27/034 386/241 |
| 2011/0085059 A1* | 4/2011 | Noh | G11B 27/034 348/231.99 |
| 2012/0093476 A1 | 4/2012 | Mountain | |
| 2016/0314819 A1 | 10/2016 | Elsner | |
| 2018/0255362 A1 | 9/2018 | Chittella et al. | |

OTHER PUBLICATIONS

International Search Report and Written Opinion for PCT/IN2019/050496 dated Oct. 14, 2019, all pages.

* cited by examiner

*Primary Examiner* — Kunal Langhnoja
(74) *Attorney, Agent, or Firm* — Kilpatrick Townsend & Stockton LLP

(57) ABSTRACT

Various arrangements for generating thumbnail images for video content as the video content is being received are presented. A television receiver may first receive video content. A thumbnail generation process may be woken from a sleep state based on a predefined time period elapsing. The received video content may be monitored for a next-received I-frame. A thumbnail image may be created from the I-frame and may be mapped to a timestamp. The thumbnail generation process may then be caused to enter the sleep state for the predefined time period.

19 Claims, 5 Drawing Sheets

LIVE THUMBNAIL IMAGE GENERATION

BACKGROUND

Thumbnail images can be a useful visual reference to a user navigating through video content. By viewing thumbnail images, a user may be able to determine if the user needs to navigate forward, back, or is at a desired location within the video content. Generation of thumbnail images can be a processing-intensive task, which could negatively affect other tasks that require processing. If a user may view video content soon after it is received, it may be desirable to have thumbnail images created and ready as soon as possible for use in navigation to allow the user to navigate efficiently and effectively through the video content.

SUMMARY

Various arrangements for generating thumbnail images for video content navigation are presented. In some embodiments, a method is presented. In other embodiments, a television receiver or processor-readable medium may be presented. A television receiver may receive video content. While the video content is being received, various functions may be performed: A thumbnail generation process may be woken or activated from a sleep state. The received video content may be monitored for an I-frame. A thumbnail image may be created that is mapped to a timestamp. The thumbnail generation process may cause the thumbnail image mapped to the timestamp to be stored. In response to storing the thumbnail image, the thumbnail generation process may enter the sleep state.

Embodiments of such arrangements may include one or more of the following features: The thumbnail generation process may be woken from the sleep state based on determining a predefined time period has expired. The thumbnail generation process may be woken from the sleep state based on a current processing load of the one or more processors. Receiving the video content may include: decrypting a control message to obtain a descrambling key; receiving scrambled video content; and descrambling the scrambled video content using the descrambling key, wherein the thumbnail image is created after the scrambled video content is descrambled. After descrambling the scrambled video content using the descrambling key and creating the thumbnail image, the video content may be encrypted, wherein the thumbnail is created before the descrambled video content is encrypted. The encrypted video content may be stored to a processor-readable storage medium of the television receiver. The received video content may be stored to a time shift buffer stored on a non-transitory computer-readable medium. During the sleep state, the thumbnail generation process may only monitors whether the predefined time period has elapsed since a previous thumbnail was generated. Storing the thumbnail image mapped to the timestamp may include: a first file being created that stores a plurality of thumbnail images, the plurality of thumbnail images comprising the thumbnail image; and a second file being created that links each of the plurality of thumbnail images with a timestamp of a plurality of timestamps. While the video content is being received, a video content navigation interface may be output for presentation, wherein the video content navigation interface comprises: a scrub bar; and the thumbnail image, wherein a time mapped to the timestamp of the thumbnail image is currently selected. Outputting the video content navigation interface may include: receiving user input selecting a location on the scrub bar; and presenting a second thumbnail image that is mapped to a timestamp corresponding to the location on the scrub bar. The thumbnail image may be a reduced resolution version of the I-frame.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
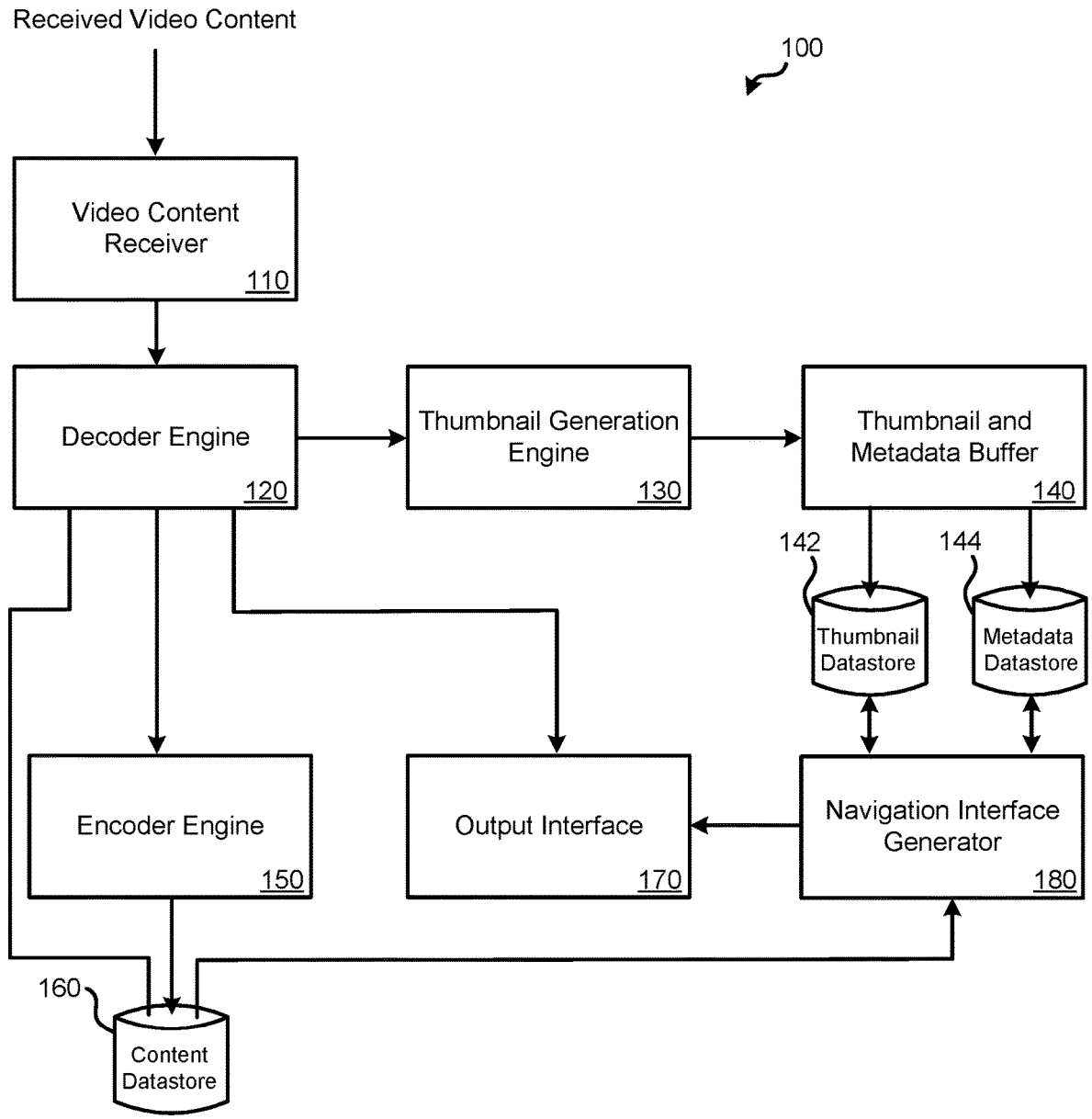
FIG. 1 illustrates an embodiment of a system that generates live thumbnails.

Generation of thumbnail images (referred to as "thumbnails" for short) as video content is received by a television receiver may have several advantages. First, by generating the thumbnails as content is received, the thumbnails may become available for use for navigating through video content sooner than if the thumbnails were created as part of a batch process after the video content has been fully received. Second, video content may be received in an encrypted or scrambled format and subsequently decrypted or descrambled for output, storage, or further processing. When such content is stored locally, the video content may be re-encrypted or re-scrambled. By creating thumbnails as the video content is received and initially descrambled or decrypted, a later descrambling or decryption step solely or primarily for the purpose of thumbnail generation may be avoided, thereby decreasing the total amount of processing needing to be performed.

A possible disadvantage of generating thumbnails can be the consumption of processing resources. Therefore, if a processing system is being used for multiple tasks, generation of one or more thumbnail images may negatively impact the processing resources available for other tasks. For instance, if a user is viewing content as it is being received or from a time-shift buffer, generation of thumbnails may negatively impact the quality of audio and/or video output for presentation to the user or the ability of the device to perform real-time descrambling, decryption, and/or storage. In order to avoid such a disadvantage, a sleep process may be incorporated as part of the thumbnail generation process such that the thumbnail generation process is only active for a relatively short period of time when a predefined time period has expired. Once a thumbnail is generated and stored, the thumbnail generation process may return to a sleep state for the predefined time period. Further, the thumbnails and associated metadata (e.g., timestamps)

may only be written to a hard drive or solid-state drive (or other long-term storage device) after a certain number of thumbnails have been generated or some other trigger event has occurred. As such, the number of write operations to the hard drive or solid-state drive may be decreased.

In some embodiments, one or more additional actions may be taken to reduce the processing load of thumbnail generation as live content is received. In some embodiments, the amount of time between when thumbnails are generated may be dynamically varied based on the processing load on the one or more processors of the television receiver. Therefore, if the one or more processors are currently being significantly utilized, the amount of time between generation of thumbnails may be increased (to decrease the amount of processing load due to thumbnail generation). Additionally or alternatively, the thumbnail interval may be adjusted based on the type of display that will be used to output the content for presentation. For example, on a small display, having fewer thumbnails (which may be created using a lower resolution) may be sufficient for navigation. A smaller number of thumbnails may be sufficient due to the size of the scrub bar (due to the size of the display) and the inability to do highly precise movements with a finger on a small scrub bar. Therefore, the size and/or resolution of a display that will be used for output may be taken into account to determine the amount of time and/or resolution for thumbnails. Additionally or alternatively, thumbnail creation may be offloaded to a cloud-based server. An I-frame may be sent to the cloud-based server. The cloud-based server will do the frame decoding, resizing, then re-encode as a JPEG image (or other format). This arrangement may increase network traffic, but may decrease the amount of processing performed locally by the one or more processors of the television receiver. Cloud-based thumbnail generation may be triggered by the one or more processors experiencing at least a threshold level of processing load.

Further detail regarding the embodiments is provided in relation to the figures. FIG. 1 illustrates an embodiment of a system 100 that generates live thumbnails. "Live" refers to the concept that the thumbnails are generated as the video content is received rather than as part of a batch process performed at a later time. When system 100 receives video content and is triggered to generate a thumbnail, the thumbnail may be generated and ready for use in presentation as part of a navigational interface within a short time, such as 0.25 s-5 s. System 100 may be incorporated as part of a television receiver. Such a television receiver may be in the form of a set top box (STB) component that is integrated as part of a television, or a computerized device that is configured to present video content. For instance, a computerized device such as a digital media player, smartphone, tablet computer, or gaming device may have an application installed on it that allows for video content to be received, recorded, and/or output for presentation (either directly via a display of the computerized device or via an external device (e.g., television)). System 100 may include: video content receiver 110; decoder engine 120; thumbnail generation engine 130; thumbnail and metadata buffer 140; thumbnail datastore 142; metadata datastore 144; encoder engine 150; content datastore 160; output interface 170; and navigation interface generator 180.

Video content receiver 110 may receive a stream of video from a source, such as a streaming video provider. The streaming video received may be a television channel, or some other form of streaming media, such as a streamed television program, movie, or other form of content. In some embodiments, streaming audio may accompany the streaming video. Video content receiver 110 may receive streaming video via a dedicated media distribution network, such as a satellite-based communication network. In some embodiments, video content receiver 110 may receive video content via some other form of network, such as an IP-based network, such as the Internet. Therefore, video content receiver 110 may include one or more network interfaces, such as a Wi-Fi network interface. Video content receiver 110 may also include specialized hardware to allow video content receiver 110 to receive video content from a specialized content distribution network. For example, video content receiver 110 may include one or more tuners configured to receive content broadcast via satellite. In other embodiments, video content receiver 110 may be configured to receive content via a cable network or over the air (OTA).

Decoder engine 120 may generally refer to software, firmware, and/or hardware that can decode, decrypt, and/or descramble received video content. Decoder engine 120 may perform multiple functions, such as decrypting an encrypted message (e.g., an entitlement control message) to obtain a key (e.g., control word) that is used to descramble video content. Further detail regarding such an arrangement is provided in relation to FIG. 2. In other embodiments, the video content may not be scrambled or encrypted. Scrambling generally refers to a "light" form of encryption, which can be converted into an unscrambled version if the correct descrambling key is available with a minimal amount of processing resources. Encryption may be understood to be much "heavier" in that a significantly greater amount of processing may be required to decrypt the encrypted message using a correct encryption key. Encrypted data is typically more secure than scrambled data. Decoder engine 120 may output decoded video content for storage to encoder engine 150, content datastore 160, or output interface 170.

Content datastore 160 may be a non-transitory processor readable medium, such as memory, a hard drive, or a solid state drive to which video content may be stored for a period of time. In some embodiments, encoder engine 150 may scramble and/or encrypt the descrambled and/or decrypted data received from decoder engine 120. Encoder engine 150 may encrypt and/or scramble data using one or more keys for local storage on content datastore 160 such that video content is not stored unprotected. Such an arrangement may help prevent theft of copyrighted materials. If the user is viewing the video content live, decoder engine 120 may output the decrypted and/or descrambled video content to output interface 170. Output interface 170 may output the video content via a display device, such as a display screen. This display device may be incorporated as part of the same device as system 100 or may be external from system 100. For instance, system 100 may be incorporated as part of a device that is connected with a television or other form of display.

Thumbnail generation engine 130 may represent software or firmware that is executed using one or more processors. Thumbnail generation engine 130 may operate in at least two modes. A first mode may be in active mode, during which thumbnail generation engine 130 is actively generating a thumbnail image. A second mode may be a sleep mode, during which thumbnail generation engine 130 is disabled and not using any processing resources besides, possibly, keeping track of an amount of time that has elapsed since the previous thumbnail was generated in comparing this amount of time with a predefined time period. Thumbnail generation engine 130 may, when active, monitor for a next occurring frame that is output by decoder engine 120 or otherwise received by video content receiver 110. The frame monitored for may be an I-frame. An I-frame may be a type of frame used in MPEG (or, more generally, video) encoding that includes all of the data necessary to render or create a visual image without any additional information. Other forms of frames (e.g., P-frames, B-frames) may be incremental and may rely on referencing a previous or future I-frame. Thumbnail generation engine 130 may use such I-frame to create a reduced resolution image of the I-frame. Such a reduced resolution image may be appropriate for presentation in a smaller format.

When thumbnail generation engine 130 has created a thumbnail image, a timestamp that corresponds to the time at which the thumbnail was created from the received video content may be generated. This timestamp and thumbnail image may be temporarily stored by thumbnail and metadata buffer 140. Thumbnail and metadata buffer 140 may use random access memory or some other form of processor readable and writable memory to temporarily store the thumbnail image and the associated metadata. Occasionally, data from thumbnail and metadata buffer 140 may be written to thumbnail datastore 142 and metadata datastore 144. For instance, after 30 minutes of thumbnails have been captured or a particular piece of video content has ended, thumbnails and metadata from thumbnail and metadata buffer 140 may be written to thumbnail datastore 142 and metadata datastore 144. Thumbnail datastore 142 and metadata datastore 144 may be stored to a more permanent form of processor readable non-transitory storage medium. For example, a hard drive or solid state drive may be used to store thumbnail datastore 142 and metadata datastore 144. By temporarily storing thumbnails and metadata to thumbnail and metadata buffer 140, the number of writes to thumbnail datastore 142 and metadata datastore 144 may be decreased. In some embodiments, thumbnail and metadata buffer 140 may not be present and thumbnail generation engine 130 may write thumbnails and metadata directly to thumbnail datastore 142 and metadata datastore 144.

After thumbnail generation engine 130 has generated a thumbnail and link to a particular timestamp with the thumbnail, thumbnail generation engine 130 may enter the sleep mode. While in the sleep mode, the amount of processing being required by thumbnail generation engine 130 may be very low. While in the sleep mode, thumbnail generation engine 130 may monitor an amount of time that has elapsed since the previous thumbnail was generated and periodically or occasionally compare this amount of time with a predetermined time threshold. When the amount of time meets or exceeds the predetermined time threshold, thumbnail generation engine 130 may transition to the active mode.

Thumbnail datastore 142 may include one or more thumbnail storage files. Each thumbnail storage file may include multiple thumbnails. Each thumbnail within thumbnail datastore 142 may be mapped to a unique identifier (that is unique at least within the particular file). Metadata datastore 144 may include one or more metadata storage files. Each metadata storage file may include a list, table, or database of timestamps, with each timestamp being linked with a unique identifier. Therefore, for a particular time, navigation interface generator 180 may query metadata datastore 144 to retrieve a particular identifier. The identifier may then be used to obtain the corresponding thumbnail from thumbnail datastore 142.

Navigation interface generator 180 may be used to generate a navigation interface to allow a user to move forward or backward within video content being output for presentation. The navigation interface may include a scrub bar that allows a user to see what content is currently available for playback. When a user selects a different portion of the video content, a thumbnail may be presented to visually represent to the user the currently selected position within the video content. The thumbnail may be selected based on the timestamp associated with the thumbnail being closest (or the next earlier timestamp or the next later timestamp) to the times selected on the scrub bar. Further detail regarding such an interface is provided in relation to FIG. 3. Navigation interface generator 180 may be performed using one or more processors. Therefore, navigation interface generator 180 may be performed by the same one or more processors that are being used to perform thumbnail generation engine 130.

Figure 2:
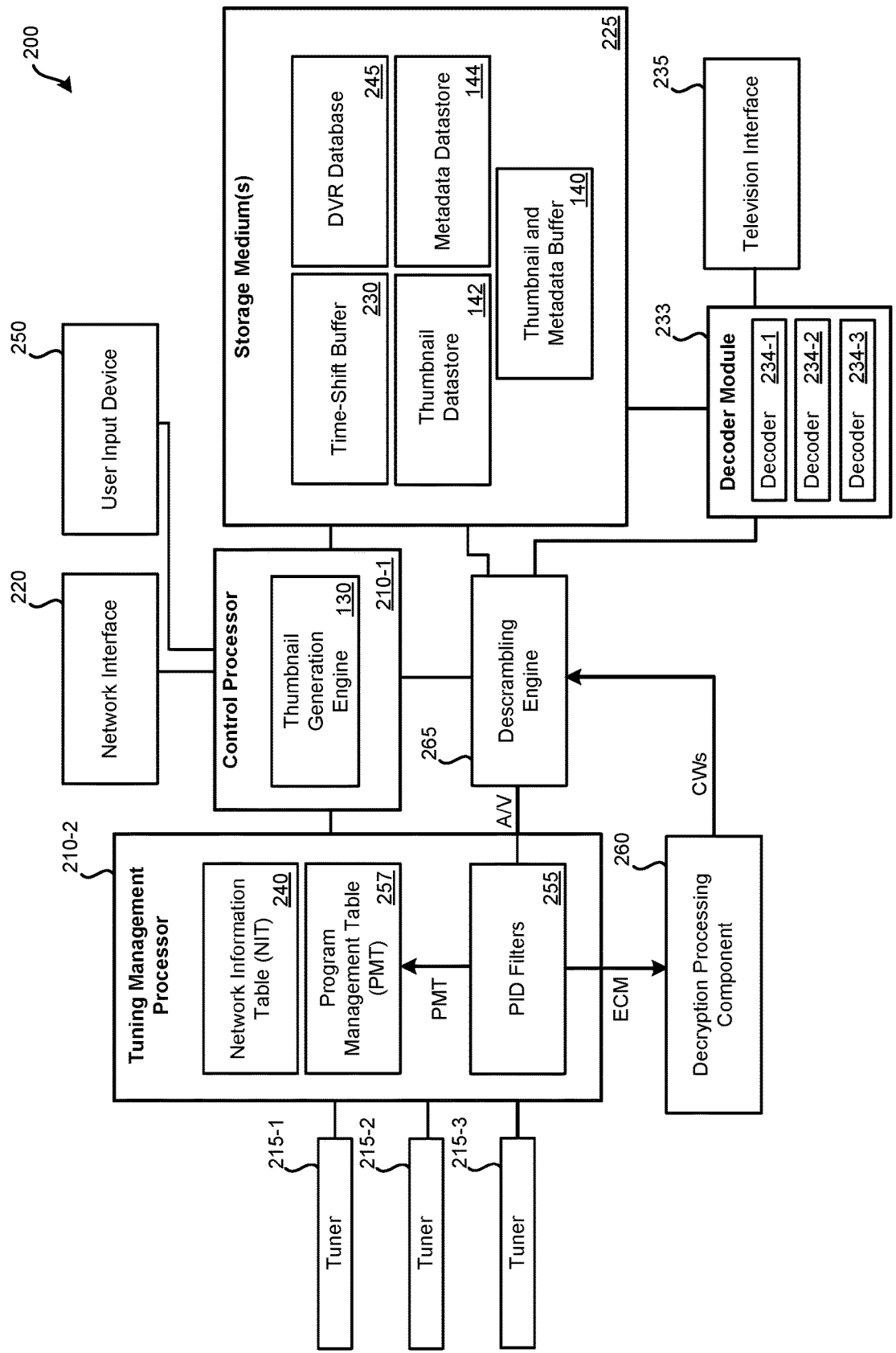
FIG. 2 illustrates an embodiment of a television receiver that may include the system of FIG. 1 and may generate live thumbnails.

FIG. 2 illustrates an embodiment of a television receiver 200. Television receiver 200 represents a type of device that may incorporate components of and functionality of system 100 of FIG. 1. Television receiver 200 may be in the form of a separate device configured to be connected with a display device, such as a television. Embodiments of television receiver 200 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 200 may be in the form of an STB that outputs video and/or audio to a display device, such as a television. Television receiver 200 may be incorporated as part of a television. Television receiver 200 may include: processors 210 (which may include control processor 210-1, tuning management processor 210-2, and possibly additional processors), tuners 215, network interface 220, non-transitory computer-readable storage medium 225, timeshift buffer 230, television interface 235, networking information table (NIT) 240, digital video recorder (DVR) database 245 (which may include provider-managed television programming storage and/or user-defined television programming), thumbnail datastore 142, metadata datastore 144, user input device 250, decryption processing component 260 (which can be in the form of a removable or non-removable smartcard), and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID (packet identifier) filters 255 may be handled by separate hardware from program management table 257.

Processors 210 may include one or more specialized and/or general-purpose processors configured to perform processes such as tuning to a particular channel, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user input device 250. Control processor 210-1 may handle incoming data from network interface 220 and user input device 250. Additionally, control processor 210-1 may be configured to output data via network interface 220. Control processor 210-1 may execute a process, thread, or task to perform the functions of thumbnail generation engine 130 as detailed in relation to FIG. 1.

Tuners 215 may include one or more tuners used to tune to transponders that include broadcasts of one or more television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies or transponder streams to tune.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. This communication may be bidirectional: data may be transmitted from television receiver 200 to a television service provider system and from the television service provider system to television receiver 200. Network interface 220 may be configured to communicate via one or more networks, such as the Internet, to communicate with a television service provider system. Information may be transmitted and/or received via network interface 220. For instance, instructions (e.g., regarding subscription portability, recording instructions, confirmation settings) from a television service provider may also be received via network interface 220, if connected with the Internet. Network interface 220 may be used to provide a confirmation to a television service provider that instructions received from the television service provider have indeed been executed.

Storage medium(s) 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to time-shift buffer 230, thumbnail datastore 142, metadata datastore 144, thumbnail and metadata buffer 140, and/or DVR database 245. Recorded television programs, which were recorded based on a provider- or user-defined timer may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 240 and/or PMT 257 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265 simultaneously. For instance, each of decoders 234 within decoder module 233 may be able to only decode a single television channel at a time. While decoder module 233 is illustrated as having three decoders 234 (decoder 234-1, decoder 234-2, and decoder 234-3), in other embodiments, a greater or fewer number of decoders may be present in television receiver 200. A decoder may be able to only decode a single high definition television program at a time.

Television interface 235 may serve to output a signal to a television (or another form of display device) in a proper format for display of video and playback of audio. As such, television interface 235 may output one or more television channels or stored television programming from storage medium 225 (e.g., television programs from DVR database 245) to a television or other form of display device for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 200 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

DVR database 245 may be used to record entire television programs. Time-shift buffer 230 may be used to temporarily record video content that is being output for presentation while being received via tuners 215 (or network interface 220). A user may begin viewing television programming "live," but may elect to "pause" the content. While "paused," the content may be recorded to time-shift buffer 230. The user may then navigate forward and backward through the recorded portion of the content. The user may eventually catch back up the live broadcast and the time-shift buffer 230 may cease to be recorded. In other embodiments, time-shift buffer 230 may continue to be recorded to enable rewinding through the received content.

User input device 250 may include a remote control (physically separate from television receiver 200) and/or one or more buttons on television receiver 200 that allow a user to interact with television receiver 200. User input device 250 may be used to select a television channel for viewing, and/or program a timer stored to DVR database 245, wherein the timer is used to control the DVR functionality of control processor 210-1. In some embodiments, it may be possible to load some or all of preferences to a remote control. As such, the remote control can serve as a backup storage device for the preferences.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption engine 261 of decryption processing component 260 to decrypt ECMs. Decryption of an ECM may only be possible if the user has authorization to access the particular television channel associated with the ECM. When an ECM is determined to correspond to a television channel being stored and/or displayed, the ECM may be provided to decryption processing component 260 for decryption.

When decryption processing component 260 receives an encrypted ECM, decryption processing component 260 may decrypt the ECM to obtain some number of control words. In some embodiments, from each ECM received by decryption processing component 260, two control words are obtained. In some embodiments, when decryption processing component 260 receives an ECM, it compares the ECM to the previously received ECM. If the two ECMs match, the second ECM is not decrypted because the same control words would be obtained. In other embodiments, each ECM received by decryption processing component 260 is decrypted; however, if a second ECM matches a first ECM, the outputted control words will match; thus, effectively, the second ECM does not affect the control words output by decryption processing component 260. Decryption processing component 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or decryption processing component 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by decryption processing component 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by decryption processing component 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235. Video and/or audio that is to be stored to DVR database 245 may be re-encrypted and/or re-scrambled using a different encryption and/or scrambling method and keys. Such re-encryption and/or scrambling may be performed by control processors 210-1 or some other processing component.

It should be understood that storage medium 225 may include multiple forms of processor-readable storage devices. For example, thumbnail and metadata buffer 140 may be stored using an on-processor buffer or random access memory, while thumbnail datastore 142, metadata datastore 144, and DVR database 245 may be stored using a hard drive or solid-state drive.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as communication buses, processors, storage mediums, interfaces, power supplies, that have been omitted for simplicity.

Figure 3:
FIG. 3 illustrates an embodiment of an interface that allows for thumbnail-based navigation.

FIG. 3 illustrates an embodiment 300 of an interface that allows for thumbnail-based navigation. The thumbnail-based navigation interface of FIG. 3 can be created using television receiver 200 or some other form of system or device that has system 100 of FIG. 1 incorporated. In embodiment 300, video content 310 is currently being output by television 301. Video content 310 may be video content that is received live and is being output for presentation soon after being received by the television receiver. In embodiment 300, video content 310 corresponds to current playback location 325 of time shift buffer visual representation 330 on scrub bar 340. Live video, as received, would correspond to playback location 331. By providing user input, such as by pressing a rewind button or scrolling to the left, a user may move visual indication 321 along scrub bar 340 to a position within time shift buffer visual representation 330. Based on the location of visual indication 321, a corresponding thumbnail image may be retrieved from a thumbnail datastore, such as thumbnail datastore 142 of FIG. 1. The retrieved thumbnail may be presented in thumbnail display region 320. As can be seen in the example of embodiment 300, at the earlier location corresponding to visual indication 321, the video content features a pair of horses as indicated in thumbnail display region 320. If the location of visual indication 321 is changed, a different thumbnail may be retrieved, which would correspond to a different thumbnail image.

Figure 4:
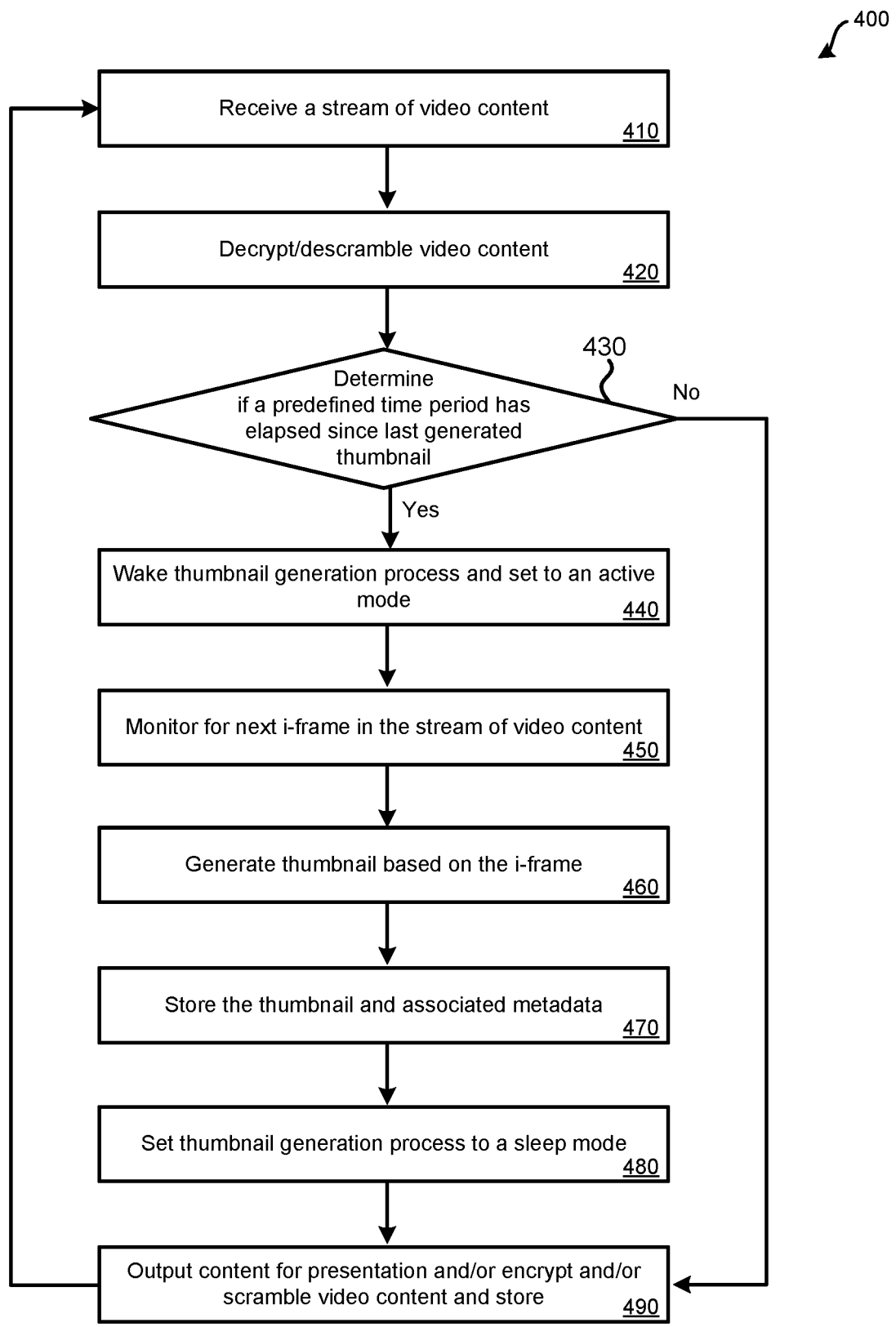
FIG. 4 illustrates an embodiment of a method for generating live thumbnails.

The systems, devices, and interfaces of FIGS. 1-3 may be used to perform various methods. FIG. 4 illustrates an embodiment of method 400 for generating live thumbnails. Method 400 may be performed using system 100. Method 400 may be performed using system 100 as incorporated as part of television receiver 200. Each step of method 400 may be performed using system 100 of FIG. 1. At block 410, a stream of video content may be received. A user may have provided input indicating whether the video content is to be output for viewing live, is to be recorded to a non-transitory computer readable medium for viewing at a later time, or both. In some embodiments, the stream of video content is received via a tuner, such as a tuner that receives content from a satellite via a satellite antenna. In some embodiments, the stream of video content may be received via a packet-based network, such as the Internet. In other embodiments, a cable based network or some other form of wired or wireless communication may be possible to enable the television receiver to receive the stream of video content at block 410. The video content being received at block 410 may continue to occur throughout method 400.

At block 420, the received video content may be decrypted and/or descrambled by the television receiver. In some embodiments, such as those using a set top box, a decryption key may be used to decrypt an encrypted message. From the encrypted message, a descrambling key may be obtained. The scrambling key may then be used to descramble the received video content. In other embodiments, some other arrangement may be used to decrypt, descramble, or decode the received video content. In some embodiments, the video content may not be encrypted or scrambled.

At block 430, a determination may be made by a thumbnail generation process being executed by one or more processors of the television receiver as to whether a predefined time period has elapsed since a last thumbnail was generated for the piece of video content. The thumbnail generation process may be in a sleep mode while block 430 is being performed. This predefined time period may be set by a television service provider via a configuration setting of the television receiver. Therefore, the predefined time period may be adjusted by the television service provider. The greater the predefined time period, the fewer the number of thumbnails generated and the less amount of processing needing to be performed by the one or more processors. The smaller the predefined time period, the greater the number of thumbnails generated and the greater the amount of processing needing to be formed by the one or more processors to create the thumbnails.

In some embodiments, the amount of time between when thumbnails are generated may be dynamically varied based on the processing load on the one or more processors of the television receiver. Therefore, if the one or more processors are currently being significantly utilized, the amount of time between generation of thumbnails may be increased (to decrease the amount of processing load due to thumbnail generation).

The amount of time may additionally or alternatively be adjusted based on the type of display that will be used to output the content for presentation. For example, on a small display, having fewer thumbnails (which may be created using a lower resolution) may be sufficient for navigation. A smaller number of thumbnails may be sufficient due to the size of the scrub bar (due to the size of the display) and the inability to do highly precise movements with a finger on a small scrub bar. Therefore, the size and/or resolution of a display that will be used for output may be taken into account to determine the amount of time and/or resolution for thumbnails.

Additionally or alternatively, thumbnail creation may be offloaded to a cloud-based server, such as a server operated by a television service provider. An I-frame of the received live video may be sent to the cloud-based server, such as via an IP-based network (which may not be the same network through which the content was received, such as in a satellite-based television distribution network). The cloud-based server may then perform the frame decoding, resizing, then re-encode the resized image as a JPEG image (or other format). This arrangement may increase network traffic of the television receiver, but may decrease the amount of processing performed locally by the one or more processors of the television receiver. Cloud-based thumbnail generation may be triggered by the one or more processors experiencing at least a threshold level of processing load.

If block 430 is evaluated in the negative, the thumbnail generation process may remain in a sleep mode. While in the sleep mode, the only function being performed by the thumbnail generation process may be to repeatedly determine if the predefined time period has elapsed since the last generated thumbnail. Therefore, if block 430 is evaluated in the negative, method 400 may proceed to block 490.

If block 430 is evaluated in the positive, method 400 may proceed to block 440. At block 440, the thumbnail process may be woken from a sleep state and set to an active state or mode. When set to an active state, the thumbnail generation process may be triggered to create a thumbnail image based on video content being received. At block 450, the thumbnail generation process may monitor the stream of video content being received for the next I-frame to be received. The thumbnail generation process may monitor the output of the component that is decrypting and/or descrambling the received video content for the I-frame. For example, referring to television receiver 200, thumbnail generation engine 130 may monitor an output of descrambling engine 265 for the next I-frame.

Based on the located I-frame, a thumbnail image may be generated at block 460. The thumbnail image may be based on the I-frame and may be of a reduced resolution from the I-frame. Along with generating the thumbnail image, at block 460, metadata may be created, such as a timestamp that indicates a time to which the thumbnail image corresponds. At block 470, the thumbnail and the associated metadata may be stored. Initially, the thumbnail in the associated metadata may be stored to a buffer, such as in random access memory (RAM). After a certain number of sets of thumbnails and metadata have been stored to the buffer, a batch write process may be performed to write the thumbnails and the metadata to a long-term processor readable storage medium, such as a hard drive or solid state drive. In some embodiments, rather than being based on a certain number of sets of thumbnails and metadata having been stored to the buffer, after a predefined period of time, such as 30 minutes, the sets of metadata and thumbnails may be written to the long-term processor readable storage medium. In some embodiments, other events may trigger the batch write, such as: the end of the stream of video content being received, a user command being received to end recording, or a power off command.

At block 480, the thumbnail generation process may be set to a sleep mode in response to the thumbnail having been generated and stored at block 460 and 470. Since a thumbnail image was just generated, it can be expected that at least several seconds will elapse before block 430 determines that the predefined time period has elapsed. In some embodiments, the predefined time period may be set to five seconds. In other embodiments, greater or shorter predefined time periods may be possible.

At block 490, the video content being received at block 410 and decrypted and/or descrambled at block 420 may be: output for presentation and/or stored. If output for presentation, the descrambled and/or decrypted content may be output to a presentation device, such as a display screen, incorporated as part of the television receiver device. For instance, a display of a tablet computer may be used. In other embodiments, an external display may be used, such as a television or monitor connected with the television receiver. Additionally or alternatively, the content may be stored for later viewing. The content may be stored as part of a time-shift buffer, such as if a user is currently viewing an earlier portion of the content being received. The content may also be stored to a DVR database, such as if the video content was scheduled to be recorded based on a timer set by a user or by the television service provider. In some embodiments, if the video content is to be stored temporarily, the video content may be scrambled and/or encrypted. If encrypted and/or scrambled, a different algorithm and/or a different scrambling or encryption key may be used than was used for decryption and/or descrambling at block 420.

Figure 5:
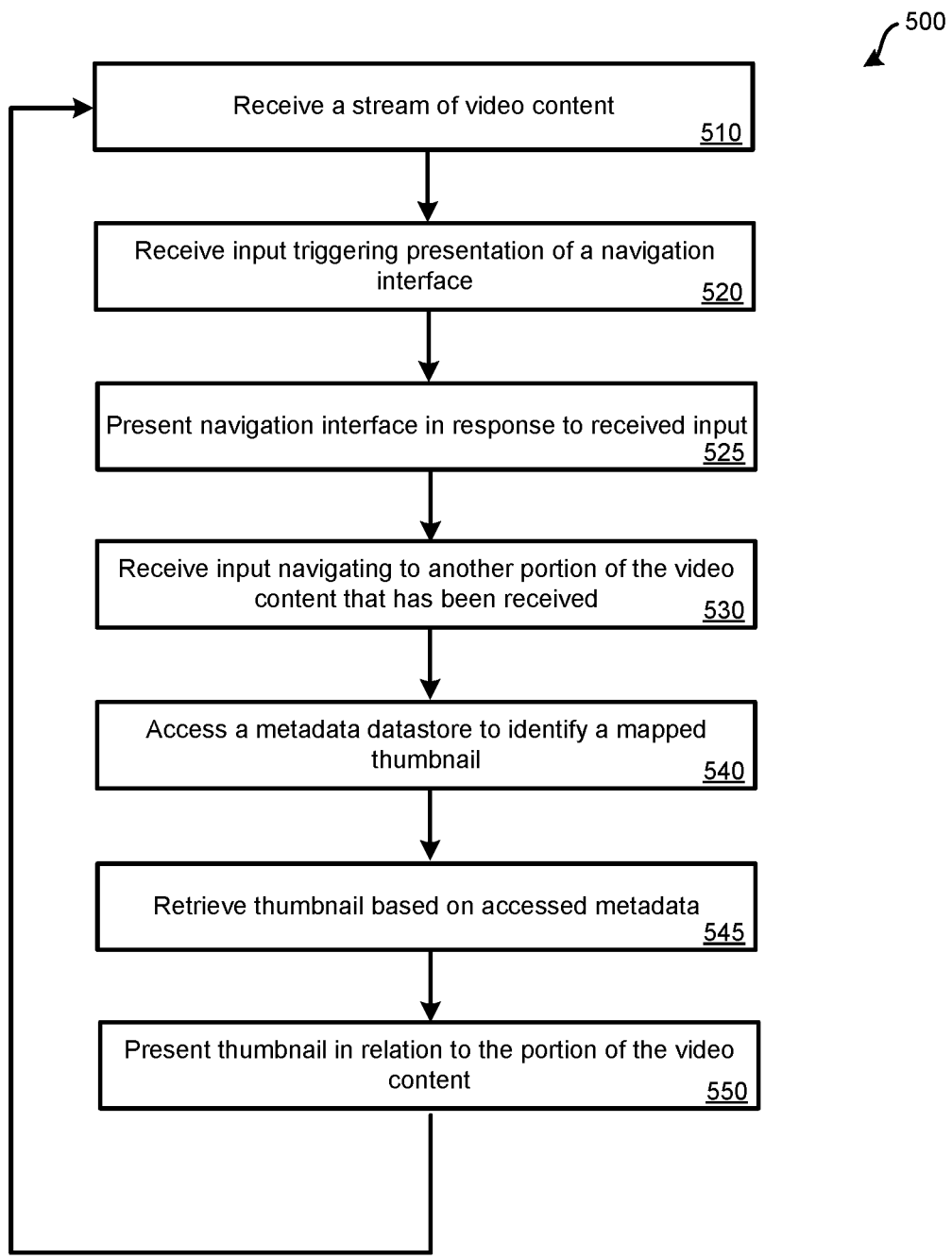
FIG. 5 illustrates an embodiment of a method for using generated live thumbnails for navigation in video content.

FIG. 5 illustrates an embodiment of a method 500 for using generated live thumbnails for navigation in video content. Method 500 may be performed using one or more thumbnails that were generated according to method 400 of FIG. 4. Each block of method 500 may be performed using a television receiver, such as the television receiver of FIG. 2. In other embodiments, a television receiver that is an application being executed by a computerized device, such as a tablet computer or smart phone, may perform method 500.

At block 510, a stream of video content may be received. A user may have provided input indicating whether the video content is to be output for viewing live, is to be recorded to a non-transitory computer readable medium for viewing at a later time, or both. In some embodiments, the stream of video content is received via a tuner, such as a tuner that receives content from a satellite via a satellite antenna. In some embodiments, the stream of video content may be received via a packet-based network, such as the Internet. In other embodiments, a cable based network or some other form of wired or wireless communication may be possible to enable the television receiver to receive the stream of video content at block 510. The video content being received at block 510 may continue to occur throughout method 500.

At block 520, input may be received that triggers presentation of a navigation interface. For instance, user may press a button on a remote control that is being used as a user input device for the television receiver. Alternatively, a user may tap the screen to trigger the presentation of the navigation interface. At block 525, a navigation interface may be caused to be presented by the television receiver. The navigation interface may be similar to the navigation interface of FIG. 3. At block 530, input may be received that is indicative of a navigation location within the video content that has been (or is being) received. The navigation interface may include a scrub bar that indicates a portion of the content that is available for navigation due to it having been previously recorded, such as using DVR functionality or a time-shift buffer. The input received at block 530 may involve moving forward or backward within the piece of content from a current playback position.

In response to a position within the video content selected at block 530, the television receiver may access a metadata datastore to identify a corresponding thumbnail at block 540. Using the metadata datastore, the television receiver may determine an identifier of a thumbnail that corresponds to a particular time within the piece of content. Using the identifier, a thumbnail datastore may be accessed to retrieve the corresponding thumbnail at block 545.

At block 550, the thumbnail retrieved at block 545 may be presented in relation to the current navigation location. A user may then continue to navigate to another location or may select the current location for playback.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for generating thumbnail images for video content navigation, the method comprising:
receiving, by a television receiver, video content;

determining, by one or more processors of the television receiver, a type of display in communication with the television receiver;
adjusting, by the one or more processors of the television receiver, a predefined time period based on the type of the display to be used to view the video content, wherein the predefined time period varies for different types of displays;
while the video content is being received:
  determining, by the one or more processors of the television receiver, that the predefined time period has expired;
  waking, by the one or more processors of the television receiver, a thumbnail generation process from a sleep state in response to determining that the predefined time period has expired;
  monitoring, by the thumbnail generation process being executed by the one or more processors of the television receiver, the received video content for an I-frame;
  creating, by the thumbnail generation process being executed by the one or more processors of the television receiver, a thumbnail image that is mapped to a timestamp;
  storing, by the thumbnail generation process being executed by the one or more processors of the television receiver, the thumbnail image mapped to the timestamp; and
  in response to storing the thumbnail image, causing the thumbnail generation process to enter the sleep state.

2. The method for generating thumbnail images for video content navigation of claim 1, wherein the thumbnail generation process is woken from the sleep state based on a current processing load of the one or more processors.

3. The method for generating thumbnail images for video content navigation of claim 1, wherein receiving the video content comprises:
  decrypting, by the television receiver, a control message to obtain a descrambling key;
  receiving, by the television receiver, via a tuner, scrambled video content; and
  descrambling, by the television receiver, the scrambled video content using the descrambling key, wherein the thumbnail image is created after the scrambled video content is descrambled.

4. The method for generating thumbnail images for video content navigation of claim 3, further comprising:
  after descrambling the scrambled video content using the descrambling key and creating the thumbnail image, encrypting the video content, wherein the thumbnail is created before the descrambled video content is encrypted; and
  storing the encrypted video content to a processor-readable storage medium of the television receiver.

5. The method for generating thumbnail images for video content navigation of claim 3, further comprising:
  storing, by the television receiver, the received video content to a time shift buffer stored on a non-transitory computer-readable medium.

6. The method for generating thumbnail images for video content navigation of claim 1, wherein, during the sleep state, the thumbnail generation process only monitors whether the predefined time period has elapsed since a previous thumbnail was generated.

7. The method for generating thumbnail images for video content navigation of claim 1, wherein storing the thumbnail image mapped to the timestamp comprises:
  creating a first file that stores a plurality of thumbnail images, the plurality of thumbnail images comprising the thumbnail image; and
  creating a second file that links each of the plurality of thumbnail images with a timestamp of a plurality of timestamps.

8. The method for generating thumbnail images for video content navigation of claim 1, further comprising, while the video content is being received:
  outputting, by the television receiver, for presentation, a video content navigation interface, wherein the video content navigation interface comprises:
    a scrub bar; and
    the thumbnail image, wherein a time mapped to the timestamp of the thumbnail image is currently selected.

9. The method for generating thumbnail images for video content navigation of claim 8, wherein outputting the video content navigation interface further comprises:
  receiving user input selecting a location on the scrub bar; and
  presenting a second thumbnail image that is mapped to a timestamp corresponding to the location on the scrub bar.

10. The method for generating thumbnail images for video content navigation of claim 1, wherein the thumbnail image is a reduced resolution version of the I-frame.

11. A television receiver, comprising:
  one or more processors;
  a memory communicatively coupled with and readable by the one or more processors and having stored therein processor-readable instructions which, when executed by the one or more processors, cause the one or more processors to:
    receive video content;
    determine a resolution of a display in communication with the television receiver;
    adjust the predefined time period based on the resolution to be used to view the video content, wherein the predefined time period varies for different resolutions;
    while the video content is being received:
      determining that the predefined time period has expired;
      based on a predefined time period expiring, activate a thumbnail generation process from a sleep state in response to determining that the predefined time period has expired;
      monitor the received video content for an I-frame by the activated thumbnail generation process;
      create a thumbnail image that is mapped to a timestamp by the activated thumbnail generation process;
      cause the thumbnail image mapped to the timestamp to be stored; and
      cause the thumbnail generation process to enter the sleep state for the predefined time period in response to storing the thumbnail image.

12. The television receiver of claim 11, wherein the processor-readable instructions that, when executed, cause the one or more processors to receive the video content comprise processor-readable instructions which, when executed, cause the one or more processors to:
  decrypt a control message to obtain a descrambling key;
  receive scrambled video content; and descramble the scrambled video content using the descrambling key, wherein the thumbnail image is created after the scrambled video content is descrambled.

13. The television receiver of claim 12, wherein the processor-readable instructions, when executed, further cause the one or more processors to:
   encrypt the video content after descrambling the scrambled video content using the descrambling key and creating the thumbnail image, wherein the thumbnail is created before the descrambled video content is encrypted; and
   cause the encrypted video content to be stored to a processor-readable storage medium of the television receiver.

14. The television receiver of claim 12, wherein the processor-readable instructions, when executed, further cause the one or more processors to:
   cause the received video content to store to a time shift buffer stored on a non-transitory computer-readable medium.

15. The television receiver of claim 11, wherein, during the sleep state, the thumbnail generation process only monitors whether the predefined time period has elapsed since a previous thumbnail was generated.

16. The television receiver of claim 11, wherein the processor-readable instructions that, when executed, cause the one or more processors to cause the thumbnail image mapped to the timestamp to be stored comprise processor-readable instructions which, when executed, cause the one or more processors to:
   create a first file that stores a plurality of thumbnail images, the plurality of thumbnail images comprising the thumbnail image; and
   create a second file that links each of the plurality of thumbnail images with a timestamp of a plurality of timestamps.

17. The television receiver of claim 11, wherein the processor-readable instructions, when executed, further cause the one or more processors to, while the video content is being received:
   cause the television receiver to output for presentation a video content navigation interface, wherein the video content navigation interface comprises:
   a scrub bar; and
   the thumbnail image, wherein a time mapped to the timestamp of the thumbnail image is currently selected.

18. The television receiver of claim 17, wherein the processor-readable instructions that, when executed, cause the one or more processors to output the video content navigation interface comprise processor-readable instructions which, when executed, cause the one or more processors to:
   receive user input selecting a location on the scrub bar; and
   cause a second thumbnail image to be presented that is mapped to a timestamp corresponding to the location on the scrub bar.

19. A television receiver, comprising:
   one or more processors;
   a memory communicatively coupled with and readable by the one or more processors and having stored therein processor-readable instructions which, when executed by the one or more processors, cause the one or more processors to:
   receive video content;
   determine a processing load of the one or more processors;
   adjust a predefined time period based on the processing load of the one or more processors, wherein the predefined time period varies based on the processing load;
   while the video content is being received:
      determining that the predefined time period has expired;
      based on a predefined time period expiring, activate a thumbnail generation process from a sleep state in response to determining that the predefined time period has expired;
      monitor the received video content for an I-frame by the activated thumbnail generation process;
      create a thumbnail image that is mapped to a timestamp by the activated thumbnail generation process;
      cause the thumbnail image mapped to the timestamp to be stored; and
      cause the thumbnail generation process to enter the sleep state for the predefined time period in response to storing the thumbnail image.

* * * * *